United States Patent
Quarato et al.

(10) Patent No.: US 6,253,205 B1
(45) Date of Patent: Jun. 26, 2001

(54) OBJECT ORIENTED TRANSLATION FRAMEWORK METHOD, APPARATUS, AND PROGRAM

(75) Inventors: James A. Quarato, Sunnyvale; David R. Anderson, Cupertino; Laura Werner, Sunnyvale; Mitch Adler, Cupertino, all of CA (US)

(73) Assignee: Object Technology Licensing Corporation, Cupertino, CA (US)

( * ) Notice: Subject to any disclaimer, the term of this patent is extended or adjusted under 35 U.S.C. 154(b) by 0 days.

(21) Appl. No.: 09/137,052
(22) Filed: Aug. 20, 1998
(51) Int. Cl.[7] .................................................. G06F 17/00
(52) U.S. Cl. ............................................ 707/103; 707/102
(58) Field of Search ................................. 707/515–530, 707/3–10, 100–104, 200–206; 712/200

(56) References Cited

U.S. PATENT DOCUMENTS

| | | | |
|---|---|---|---|
| 6,134,568 | * 11/2000 | Tonkin | 707/530 |
| 6,151,598 | * 11/2000 | Shaw et al. | 707/3 |
| 6,154,756 | * 11/2000 | Hearn et al. | 707/530 |

OTHER PUBLICATIONS

IEEE, IEEE Recommended practice for architectural description of software–intensive systems, p. 1–23, Sep. 2000.*

Lee et al., "Qualitative formal methods for requirements specification and validation of hybrid real–time safety systems", Software, IEE Proceedings, vol. 147, Issue 1, Feb. 2000.*

Kwon et al., Threshold–type call admission control in wireless/mobile multimedia networks using prioritised adaptive framework, Apr. 2000.*

* cited by examiner

*Primary Examiner*—Thomas Black
*Assistant Examiner*—David Jung
(74) *Attorney, Agent, or Firm*—Kudirka & Jobse

(57) ABSTRACT

The invention is a translation framework which performs data conversions in an object oriented environment from clipboards, drag, and drop tend entire files and entire objects into compound documents. There are three primary classes: the translator, the translator surrogates, and the translation query. Translators are heavy objects that may include the translator's shared library and supporting libraries. The framework uses light weight surrogate translators as stand-ins for translators. The surrogates do not pull in the translators unless there is a request to do an actual translation. When a translation is requested, the translator must be streamed into the address space of the repeating client. Clients desiring a document object be translated for inclusion in a compound document interact with the framework by using queries to access a translation surrogate.

3 Claims, 5 Drawing Sheets

Hot translators installation Process

OBJECT ORIENTED TRANSLATION FRAMEWORK METHOD, APPARATUS, AND PROGRAM

FIELD OF THE INVENTION

The invention broadly relates to data processing systems and methods and more particularly relates to object oriented programming.

BACKGROUND OF THE INVENTION

1. Related Patents 5,315,703, entitled "OBJECT-ORIENTED NOTIFICATION FRAMEWORK SYSTEM", by David R. Anderson, et al.

The invention disclosed herein is related to the invention described in U.S. Pat. No. 5,519,867, entitled "OBJECT-ORIENTED MULTITASKING SYSTEM", by Eugenie L. Bolton, et al., assigned to the same assignee as the invention disclosed herein and incorporated herein by reference.

The invention disclosed herein is related to the invention described in U.S. Pat. No. 5,396,625 "Object-oriented locator system" by Nguyen, assigned to the same assignee as the invention disclosed herein and incorporated herein by reference.

2. Discussion of the Background

A program in a procedural language such as Fortran or Basic, is a list of instructions that tell the computer to perform an operation. Large procedural programs are broken into subroutines with smaller lists of instructions. In a procedural language program, the emphasis is on performing operations, such as to display a text or read a disk. Variables in the procedural instructions are assigned values when instructions are executed, those values being derived from units of data read into the computer. The variables and the data are exposed to and can be manipulated by instructions in any part of the procedural program.

A program in an object oriented language such as C++ or Smalltalk, combines data and the instructions or methods that operate on the data into a single unit, the object. Typically, the programmer can limit the methods within the object to be the only route to manipulate the data contained in that object. This is the principle of encapsulation. In an object oriented program, the emphasis is on the entities that perform, represented by objects, not on the performance of operations, as in a procedural program.

The methods and variables for a particular object are defined by a class template. All objects which are instances of a given class are identical in form and behavior, but contain different data in their variables. Classes are organized in a tree structure representing the relationships among a set of classes. Classes higher in the hierarchy are superclasses. Classes lower in the hierarchy are subclasses. They can make use of the methods and variables defined in all classes above them on their branch of the class hierarchy, through the principle of inheritance. Subclasses inherit the methods and variables from their superclasses.

One object can signal another object to perform the methods contained in the receiving object, by sending a message. The message consists of the name of the receiver, the method it is to carry out, and any parameters the method may require to fulfill the request.

The variables within a method in an object may be assigned values by reference. A reference provides an alias for a variable. Instead of a value being passed to the function, a reference is passed to the original variable in the calling program. The programmer can have the function access the actual variables in the calling program. Another way to pass arguments to functions is to use pointers. A pointer variable, or simply a pointer, is a variable that holds an address value to data or to an object. Passing a pointer as an argument to a function is somewhat similar to passing a reference. They both permit the variable in the calling program to be modified by the function. However, whereas a reference is an alias for the original variable, a pointer is the address of the variable. This can be useful in accessing arrays of data. Pointers can point to objects as well as to simple data types. For example, an array of pointers allows easy access to a group of objects, and is more flexible than placing the objects themselves in an array. For instance, a group of objects can be sorted by sorting an array of pointers to the objects, instead of sorting the objects themselves.

The object oriented program written in source code by the programmer in the C++ or Smalltalk language, is compiled with a C++ or Smalltalk compiler. Then the compiled program is executed at runtime. During the running of the program, memory space can be unnecessarily occupied by objects that are no longer used. When an object is instantiated from a class that includes a pointer to a target class, an instance of the target class must also be instantiated, unless it already exists in the system memory. In early object oriented environments available in the prior art, when the referencing object was later destroyed, there was no way provided by the object oriented environment to also remove the target object. Unused objects would then accumulate in the system memory reducing the available free memory space. Later prior object oriented environments provided an automatic mechanism to reclaim memory space, by associating an up-down counter with each object that is the target of a pointer reference from another object. The counter is incremented with each additional referencing object. The counter is decremented when the referencing object is destroyed. When the counter returns to zero the target object is destroyed, thereby freeing the portion of the memory that it occupied.

The CommonPoint™ application system provides a comprehensive set of services for rapidly building flexible, portable software solutions. Based on object-oriented programming structures called frameworks, it revolutionized the way software is created and used, especially in networked environments.

"CommonPoint System Architecture," provides frameworks for program structure, compound documents, graphics, text, time media, and distributed computing.

Details are provided in the book "Inside Taligent Technology" by Sean Cotter with mike Potel, Addison-Wesley Publishing Company, 1995.

The following references give some additional background on object oriented programming principles:

Booch, Grady. *Object Oriented Design and Applications.* 2d ed. Redwood City, Calif.: Benjamin/Cummings, 1994.

Budd, Timothy. *Introduction to Object-Oriented Programming.* Reading, Mass.: Addison-Wesley, 1991.

Goldstein, Neil, and Jeff Alger. *Developing Object-Oriented Software for the Macintosh.* Reading, Mass.: Addison-Wesley, 1992.

Meyer, Bertrand. *Object-Oriented Software Construction.* Englewood Cliffs, N.J.: Prentice Hall, 1988.

Taylor, David A. *Object-Oriented Information Systems: Planning and Implementation.* Reading, Mass.: Addison-Wesley, 1992.

Wirfs-Brock, Rebecca, et al. *Designing Object-Oriented Software*. Englewood Cliffs, N.J.: Prentice Hall, 1990.

ISO/ANSI C++ Draft Standard, April 1995, American National Standards Institute.

SUMMARY OF THE INVENTION

The invention is a translation framework which performs data conversions in an object oriented environment from clipboards, drag and drop tend entire files and entire objects into compound documents. There are three primary classes: the translator, the translator surrogates, and the translation query. Translators are heavy weight objects that may include the translator's shared library and supporting libraries. The framework uses light weight surrogate translators as stand-ins for translators. The surrogates do not pull in the translators unless there is a request to do an actual translation. When a translation is requested, the translator must be streamed into the address space of the requesting client. Clients desiring a document object be translated for inclusion in a compound document interact with the framework by using queries to access a translation surrogate.

The invention is a method for translating a source document object having a first format into a target document object having a second format in a computer system having a non-volatile storage and a volatile storage. The method includes the stops of:

(a) Storing a plurality of translator classes in the non-volatile storage, each of the plurality of translator classes having a plurality of translation rules for converting source document objects having first formats into target document objects having second formats;

(b) Creating a plurality of surrogate translator objects in the volatile storage, each of the plurality of surrogate translator objects being accessible by a translation query object in response to a client request for translation of a source document object having a first format into a target document object having a second format;

(c) Accessing a surrogate translator object by a translation query object in response to a client request for translation of a source document object having a first format into a target document object having a second format;

(d) The surrogate translator object causing a streaming of one of said plurality of translator classes into said volatile storage and an instantiation of a translator object therefrom in response to said accessing of said surrogate translator object; and (e) Performing with said translator object a translation of said source document object into said target document object.

DESCRIPTION OF THE FIGURES

The invention can be more fully appreciated with reference to the accompanying figures.

FIG. 2. Shows main classes that a translator provider is interested in

DISCUSSION OF THE PREFERRED EMBODIMENTS

Figure 1:
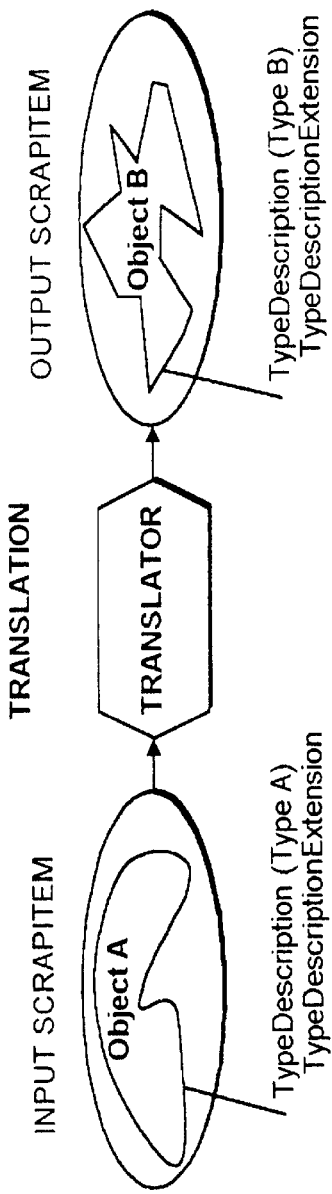
FIG. 1. Shows definition of a translation

The translation framework performs data conversions in an object oriented environment from clipboards, drag and drop tend entire files and entire objects into compound documents. There are three primary classes: the translator, the translator surrogates, and the translation query. Translators are heavy weight objects that may include the translator's shared library and supporting libraries. The framework uses light weight surrogate translators as stand-ins for translators. The surrogates do not pull in the translators unless there is a request to do an actual translation. When a translation is requested, the translator must be streamed into the address space of the requesting client. Clients desiring a document object be translated for inclusion in a compound document interact with the framework by using queries to access a translation surrogate.

I. General Overview of the Invention

The translation framework should be at a low enough level that it can handle multiple data sources on both the Taligent and foreign sides of a translation. This includes clipboards, drag and drop, translation of entire files, and objects.

Translation to and from specific host file formats should be handled by components (which we call translators) that can be installed and removed as add-ons to the basic Taligent environment while the Taligent layer is running.

Third parties must be able to develop their own translators.

Data translation code must have as few dependencies on specific host systems (such as Windows NT) as possible; it must be possible to use the same translator on deferent Taligent layers with minimal or no source code modifications.

Since host file and clipboard formats are often similar or identical, it should be possible to use the same translators to handle both clipboards and files. The design should also be able to be flexible enough to handle translation of data to and from other sources.

Input to and output from translators occurs in objects that should be wrapped in scrap items.

Translator Surrogates (stand-ins for translators) should have a one to one relationship between input and output be light weight.

II. Detailed Invention Description of the Invention

The Translation framework consists of a three primary classes: TTranslator, TTranslatorSurrogates, and TTranslationQuery.

The TTranslator class is an abstract base class which is subclassed by Translator providers. A Translator describes a branslabon it can perfomm through the type negobabons classes TTypeDescription and TTypeDescriphonExtension. For every branslabon that the Translator can perform there is and input TTypeDescription (and possibly a TTypeDescriptionExtension) and output TTypeDescription (and possibly a TTypeDescriphonExtension). For branslabons between CommonPoint's internal types the TTypeDescriphonExtension is seldom necessary.

Translators a very heavy weight objects thus the frameworks use the concept of Surrogates as stand-ins for Translators. The branslabon framework manages the Translator surrogates for clients of the framework. Clients interact with the framework by using queries. Both queries and surrogates are meant to be light weight objects that can be streamed and cached.

Translators and Translator Surrogates perform translation only on objects which are wrapped in scrap items.

TTranslatorSurrogate is a concrete class which provides the main mechanics through which translations are done in the framework. TTranslatorSurrogate is never subclasses and is always treated monomorphically by the system.

TTranslator is an abstract base class which both defines the interface and provides certain utility member functions for implementers.

Translators and Translator Surrogates do not do type negotiation, although translators provide enough information so that type negotiation can be done.

Translator providers do not have to know about surrogates and clients of the translation framework do not have to know about translators.

Translators use TTypeDescription and TTypeDescriptionExtension to completely specify what typos of translation they can perform. For example the input TTypeDescription might be that of an MGraphic while the output TTypeDescription might be of TImage. Thus this translator would convert an MGraphic to a TImage.

Translators may have a many to many input/output relationship.

Translator Surrogates have a one to one relationship between input and output.

Installed Translator Surrogate objects are unique. This uniqueness may come about by human intervention at installation time; i.e., at any given time there can only be one surrogate installed which performs the translation from Type A to Type B.

Installed Translator Surrogate objects are completely specified if their input/output TTypeDescription is known.

Translators are managed by CommonPoint through a translator service. This service maintains a list of installed translator surrogate objects.

Access to Surrogates, existing translations, and actually doing translations occurs through queries.

Translators are installed by an Installation utility which CommonPoint provides along with a boiler plate code on how to write an installable translator (shared library+ archive).

Chaining of translations is not supported in the 1.1 implementation. No changes to 1.1 API will have to be made in order support chaining in the future.

III. Translation Framework

A graphic definition of translation is depicted in FIG. 1. Conceptually, translations are always performed on objects, i.e. take object A put it through a Translator and it is transformed into object B. Objects A and B are always wrapped in scrap items. As you might guess translations are not guaranteed to be information preserving. Translators use the type negotiation classes of TTypeDescription and TTypeDescriptionExtension to fully define the Translations that they can do.

Unfortunately translators are fairly heavy weight objects which may require both the translator's shared library and supporting libraries to be loaded in order to be used to find out what translation they can perform. To get around this, the framework uses translator surrogates to present potential translations to clients. Surrogates also have access to human readable information about the Translator provider as well as the input, the output, and general description of the translation. Surrogates don't pull in the translator (and hence all of the associated libraries) unless there is a request to do an actual translation[1]. When a translation is requested the translator must be streamed into the address space of the requesting client.

[1] Surrogates are implemented with TTypeDescriptions. TTypeDescription depends on TType which is now implemented with TTypeSurrogate. TTypeSurrogate will allow lazy library loading to happen.

Surrogates are accessed through queries. Through queries it is possible to do a Translation (by getting a surrogate) or to get enough information about the installed base of translators so that clients can in fact do type negotiation. The framework also provides a special query which enables clients to ask if the framework understands the data in a given file (more about this later).

In order for this design to be successful it is necessary for the branslator provider to be de-coupled from clients of the branslabon framework. To simplify discussion of the design it is best to Wok at it from each of these two perspectives.

Translator Provider

Figure 2:
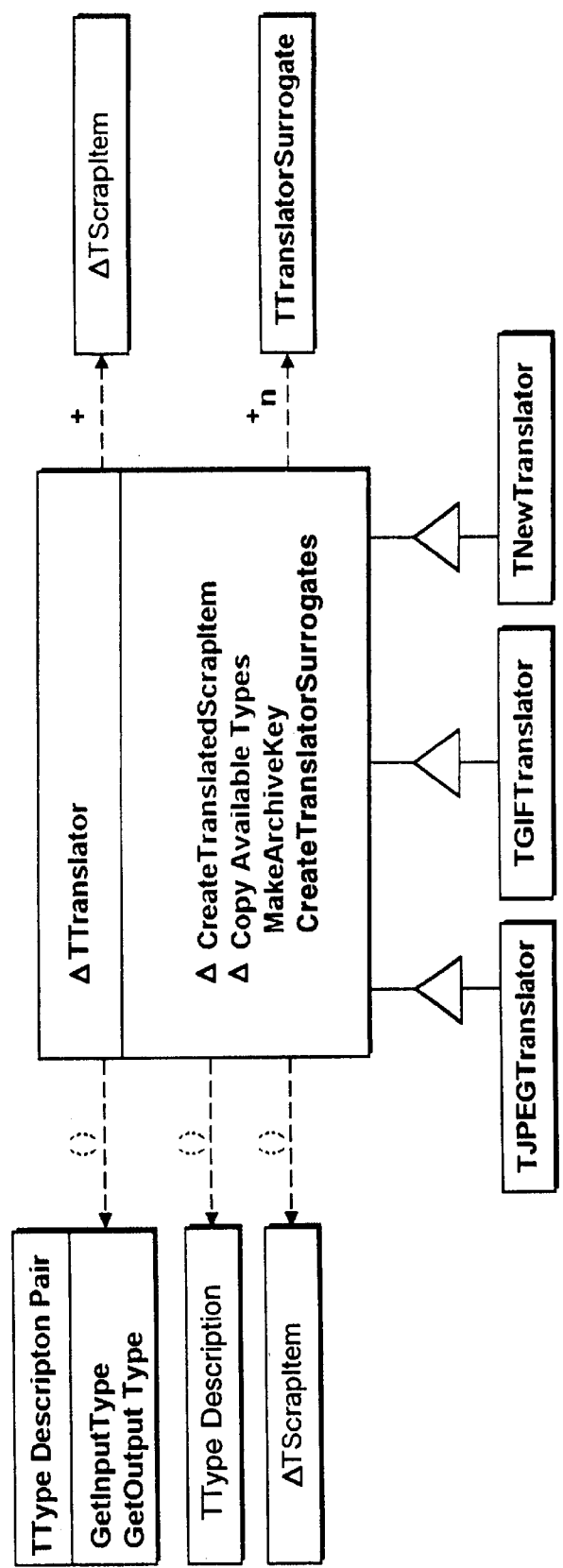

The translator provider is only concerned with the relatively few classes which are shown in FIG. 2. The notation used in the figure is the same as that which is used in the CommonPoint information set. The translator provider must subclass the abstract base class TTranslator. TTranslator presents the interface which is shared by all translators.

The translator must take in scrap items and output translated scrap items. The interface provides a way for one translator to provide many translations. A given translation performed by a translator must be defined by a unique input type and output type pair. The translator provider must present a list of translations that can be done with his translator. Currently the installation utility only allows one translator per shared library.

CommonPoint provides two member functions which help a translator provider: MakeArchiveKey and CreateTranslatorSurrogates. CreateTranslatorSurrogates generates all of the surrogates that are in the translator. MakeArchiveKey is a member function which outputs a unique archive key which is used in storing information in the archive. This agreed upon key is then used by the installation utility which reads the agreed upon archive generated by the provider.

The translator provider must provide the following information in the archive (we supply boiler plate code for this archive). For each translation the translator provider must supply a human readable form of the provider name, input type, output type and general text description of what the translation can do. This information is used by the system anytime that the translation framework must present information to humans as in, for example, Open As or Save As menu items. If this information is not supplied by the provider, then framework does the best that it can which probably means just using the text equivalent of the input and output type description.

We are tentadvely thinking of having an inspector which can be used with cpConstructor to help translator writers input most of the human information for each translation in its associated archive.

Clients of the Translation Framework

Figure 3:
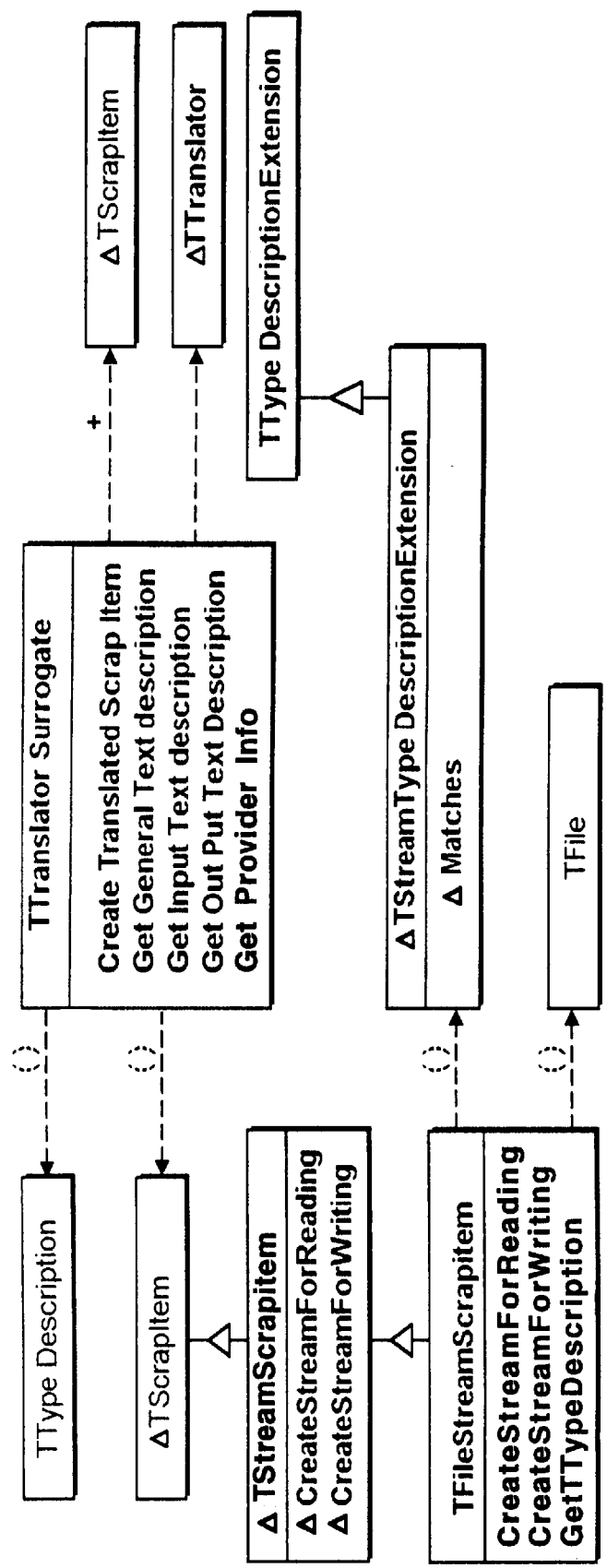
FIG. 3. Shows client classes
Figure 4:
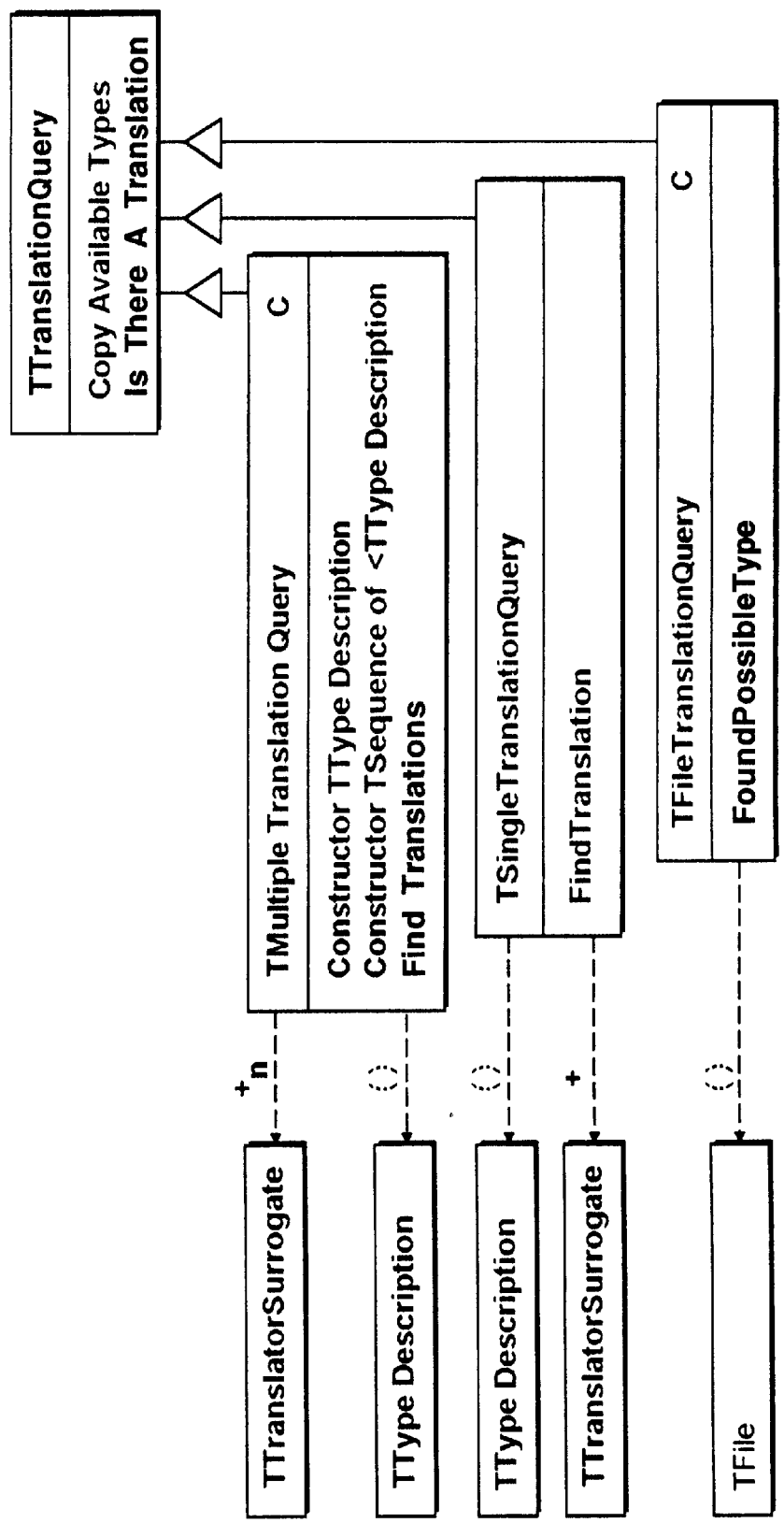
FIG. 4. Shows client query classes

The main classes that clients of the translation framework are concerned with are shown in FIG. 3 and FIG. 4. Clients use only translator surrogates to do translations. As the name implies surrogates are stand-ins for the actual translators thus they mirror most of the important functionality of the translators themselves. As mentioned above, however, surrogates are light weight containing only input/output type descriptions as a method to get to the original translator. When human interaction is necessary during a translation as shown in the FIG. 3, surrogates provide member functions which can be used to get human readable information (through their associated archives).

FIG. 3. Client Classes

The framework provides a number of convenience classes so that data stored on the host file system can be brought into a CommonPoint document. The two main classes which are used for this are TFileStreamScrapitem and TStreamTypeDescriptionExtension. TFileStreamScrapitem is constructed with a TFile and a TStreamTypeDescriptionExtension. As you might imagine, all of the pertinent information about the translation is stored in the TypeDescriptionExtension for data stored in files. The file based scrap item is just a container for the data. More will be said about how this works later. As shown in FIG. 3 TStreamTypeDescriptionExtension has one pure virtual member, Matches. Matches, which takes a TRandomAccessStream is used by the framework in performing queries. If Matches returns true then the data in the Random Access Stream matches can be described by that subclass of TStreamTypeDescriptionExtension.

Query Mechanisms Provided by the Translation Framework

As there is no way to instantiate a surrogate directly, clients must use queries to get surrogates to perform translations. The translation framework provides a number of query mechanisms: single, multiple and file translation queries. Their class relationship is shown in FIG. 4.

It is possible through static member functions of TTransiationQuery to get a list of ad of the possible translations for a given input type and to find out if a given translation exists. These static members functions are there so that clients can write their own translation queries (i.e., have access to the framework) through the static members.

The single query mechanism is constructed with a single input type description. The client passes in the desired type description of the output to the member function FindTranslation.

FindTranslation returns a value of true and a unique translator surrogate if the desired translation exists, otherwise it returns a value of false.

The multiple query mechanism returns with a value of true and a sequence of surrogates otherwise it returns a false. If a query is constructed with a single TTypeDescription then the returned sequence of translator surrogates match that input type and have various output type descriptions. If the query is constructed with a sequence of input TTypeDescriptions the returned sequence of translator surrogates is a list of translations (if they exist) for the specific input list. Clients must ask each returned surrogate for its output type description.

The FileTranslationQuery is unique in that it does not return surrogate. This query is mainly intended to be used with data files on the host system. The query is constructed with a TFile. The query returns a sequence of TStreamTypeDescriptionExtensions. This sequence of TStreamTypeDescriptionExtensions is a guess of what data is likely to be in the file. One of the TStreamTypeDescriphionExtensions that is returned can then be used to construct a TFileStreamScrapItem. TFileTranslationQuery uses the Matches member of TStreamTypeDescriptionExtension as mentioned above.

In summary, once the client has the translator surrogate he can perform a translation. In addition he can also get additional human understandable information about the translator which was provided by the translator provider.

IV. Operation Description

Using the translation framework to do internal translation between CommonPoint types is easier to understand because in general TTypeDescriptions is well defined for CommonPoint types. For example lets say a client has something that he has in MGraphic and he wants to convert it to a TImage. Here is how things may go (of course we assume that all the necessary translations are available in the framework).

Construct a query with an TScrapitemOn<MGraphic>type description.

Use the query to call a FindTranslabon with a TImage type description to get the surrogate.

Pass the MGraphic wrapped in a scrap item (TScrapitemOn<MGraphic>) into the translator surrogate and get the TImage back out wrapped in a scrap item (TScrapitemOn<TImage>).

But lets say for example we want to translate a GIF image that is stored in a file into a TImageModel. At first sight there does not appear to be any straight forward way to do this in the proposed translation framework design. One of the primary reasons for having the translation framework in the first place was of course to solve problems like this. We wanted clients to be able to translate data stored in the host files and clipboards into CommonPoint compound documents.

The first question that comes to mind is how do we ask the translation framework whether it can do the required translation. Is there such a thing as TGIFFile that we can make a type description from and hence a query to see if there is a translation? The answer is probably no. CommonPoint does not want to get involved in supporting a list of external file format types that translator providers and clients can use during translations. So what do we do now? Well, as you might suspect, all is not lost. What we are trying to do is get provWers and clients to use the type description extension to extend the translation description capabilities of the framework. Luckily in the case of the GIF (and for quite a number of other standardized file formats) the necessary information is stored in the file itself. In other words if we examine the file's contents we will be able to know if its a GIF file. This is why we supplied the TFileStreamScrapitem class. In order to construct an instance of this class you must pass in a TSbreamTypeDescriptionExtension. The class assumes that TTypeDescription is constructed with a TFileStreamScrapitem and the extension is adopted by the type description. The TFileStreamScrapitem class has a member function GetTypeDescription. Once we have the type description it is possible to instantiate a query.

Figure 5:
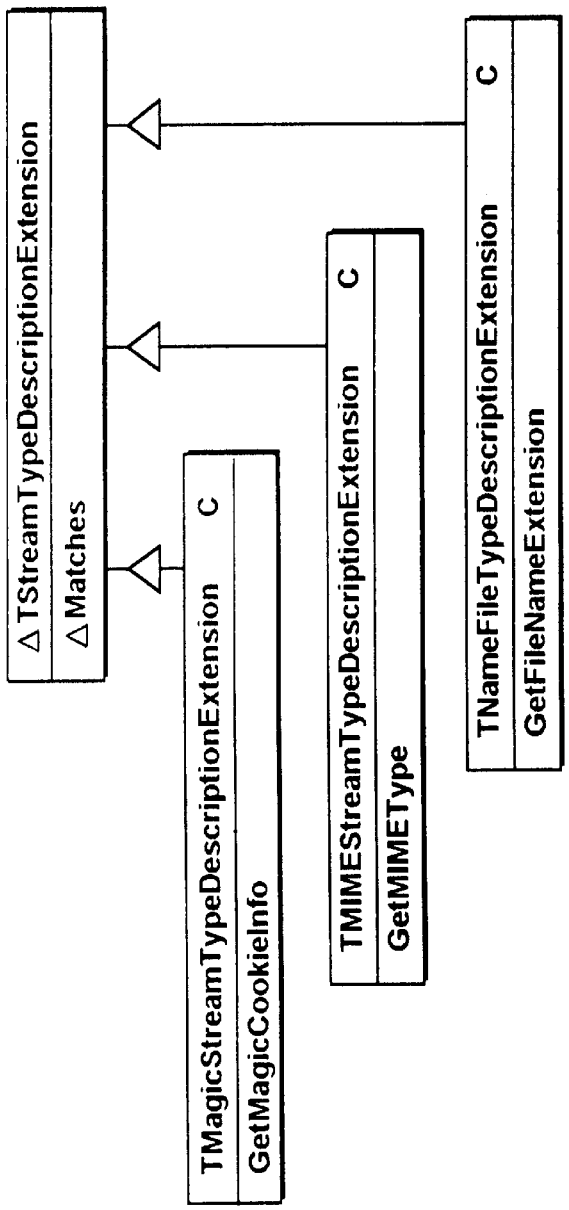
FIG. 5. Shows file convenience classes

In order for this approach to be adopted by both clients and providers, CommonPoint must start things off by providing a few convenience classes which inherit from TStreamTypeDescriptionExtension. Information about how to use these convenience classes must be clearly documented. A few convenience classes that come to mind are TMagicStreamTypeDescriptionExtension, TNameFileTypeDescriptionExtension, and TMIMEStreamTypeDescriptionExtension. These classes are shown in FIG. 5.

TMagicStreamTypeDescr,ptionExtension has a magic cookie at the beginning of the file to tell what kind of file it is, for example GIF files have GIF87 or GIF89 as the five characters. TNameFileTypeDescriptionExtension use the extension of the file name to given an indication of the data stored with in the file. While TMIMEStreamTypeDescriptionExtension represents the type of data the same way a MIME Content-Type header does: as type/subtype pairs like "image/gif" and "text/plain". The type and subtype are case-INsensitive ASCII strings.

Now let's go back to our example of how we might get a translation that would bring the GIF file into a CommonPoint document. The client first constructs a TFileStreamScrapItem with a TMagicStreamTypeDescriptionExtension. The TMagicStreamTypeDescription Extension has the proper values for a GIF file. The client calls GetTypeDescription from the TFileStreamScrapitem. Using this type description, the client can then construct a query to see it the framework can perform the translation.

Figure 6:
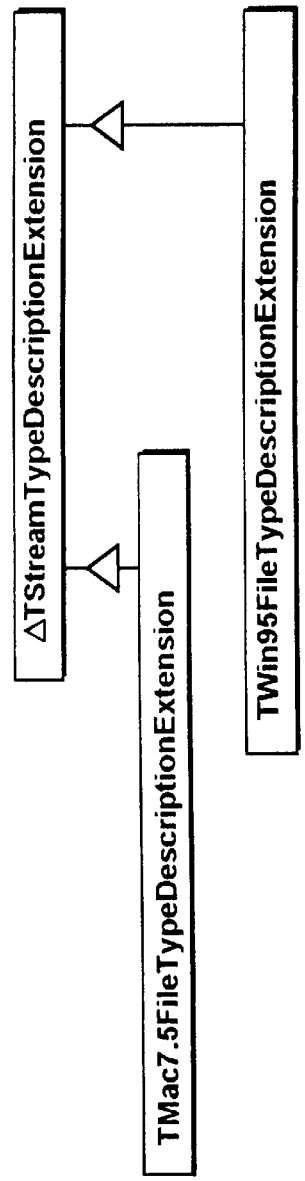
FIG. 6. Shows OS convenience classes

In addition to the above classes we will probably have to supply additional convenience classes like TMac7.5FileTypeDescriptionExtension and TWin95FileTypeDescriptionExtension as shown in FIG. 6.

V. How Translators Are Used

We walk through a number of different scenarios a fairly high level to show how translations are done using the translation framework.

A General Case (Drag and Drop, for Instance)

The Drag and Drop framework allow for the source side of a Drag and Drop transaction to specify a list representing the possible ways it's data can be provided. The target side of the transaction can then choose the type that it can make the best use of The Translation Framework can be used to expand this list and increase the chances of a target finding a type it can use.

Clients wishing to initiate a Drag operation build a TDragAndDropitem which contain a list of possible data types. Using a TMultipleTranslationQuery, the TDragAnd-Dropitem can build an expanded list of data type. When the TDragAndDropitem is asked to actually produce the scrap item in the form of the data type chosen by the target, the TDragAndDropitem uses the correct TTranslatorSurrogate to produce this scrap item.

This is just one fairly simple way that the Translation Framework can be utilized by the Drag and Drop Framework. Translations in other areas of the Drag and Drop Framework and its clients may also be useful, and are currently being investigated.

Foreign Files and Clipboards

Foreign file and clipboard translations are similar. As an example we take the case of doing a translation between a Windows clipboard format and CommonPoint object. Each Windows clipboard format is identified by an unsigned integer value. For standard (Predefined) clipboard formats, this value is a constant defined by the Win32 API. A window can place more than one clipboard object on the clipboard, each representing the same data in a different clipboard format. As a rule clipboard formats that contain the most information should be placed on the clipboard first, followed by less descriptive formats. Table 1 below shows the Windows 3.1 Standard Clipboard Formats defined in WINDOWS.H for Windows version 3.1.

TABLE 1

Windows Clipboard format.

| | |
|---|---|
| CF_TEXT | Nullterminated, plain ANSI text in a global memory block. |
| CF_BITMAP | A bitmap compatible with Windows 2.x. |
| CF_METAFILEPICT | A Windows metafile with some additional information about how the metafile should be displayed. |
| CF_SYLK | An ASCII text format used by some older Microsoft products. |
| CF_DIF | Software Art's data interchange forms (DIF). Also an ASCII text format. |
| CF_TIFF | Tag image file format (TIFF) data in a global memory block. |
| CF_OEMTEXT | Similar to CF_TEXT but using the OEM character set. |
| CF_DIB | A global memory block containing a Windows device-independent bitmap (DIB) as a BITMAPINFO structure followed by the bitmap bits. |
| CF_PALETTE | A color-palette handle. (Used in conjunction with CF_DIB.) |
| CF_PENDATA | Data is for the pen extensions to Windows. |
| CF_RIFF | Resource interchange file format (RIFF) data as a global memory block. |
| CF_WAVE | A specific case of RIFF in which the contained data is a waveform (sampled sound). |

Let's assume that the window has a clipboard with an image on it. The image has two formats CF_TIFF first and CF_BITMAP second. On the CommonPoint side we assume that we have the following translations available: GIF, JPEG, and BITMAP.

Here is how the interaction might proceed. The client asks windows what type of information is on the clipboard. He receives the information that it is in two formats, CF_TIFF and CF_BITMAP. The client then asks the framework through a MultipleQuery with two input types what translation that it can perform. The client checks the return value of FindTranslations to find that it is true. He next finds out that framework can convert only one of the image formats, that is BITMAP. But it can convert it into either a TImageModel or TEmbedderModel. He chooses what model he wants and then does the appropriate translation.

Open As and Save As

Using the translation framework for 1.1 we will present the user with menu items Open As and Save As. The Open As menu item will have a list of file types with which it can import data into the compound document, while the Save As menu item will have a list of file types that it can export data to using the translation framework.

Cursor Tools

The Cursor Tools Framework allows for commands to be separated out from the documents and packaged into a Cursor Tool. Since Cursor Tools are written to work on a specific target, the number of documents a tool works on is restricted to those document types the tool is written to know about. This restriction has been a mapr obstacle in the goal of creating generic global cursor tools. Enhancements planned for the Cursor Tool Framework will enable this goal by using the Translation Framework.

A Target Negotiator will be added to the Cursor Tools Framework, which will be a thin layer to the Translation Framework. The Target Negotiator will take the data type returned by the tool handler, and use this as the source type. This source type is what the tool is being clicked on, and represents the data type of the document. If the source type does not match the type being requested by the cursor tool, the Target Negatiator, will specify these two types in the query and request a Translation Surrogate. If a Translation Surrogate can be located, it will be used to create a properly setup instance of the requested target. This translated target will now be used by the tool.

Other Frameworks and clients may also use the Translation Framework in a similar manner as the Cursor Tools Framework. Some possibilities are global dialogs and global menu items, or anyone wishing to apply commands to specific selection, but are presented with unknown or foreign selection. The Translation Framework can be used to translate these unknown selections into selections the global dialogs or menu is capable of working on.

How Translators Are Installed

Depending upon the generic installation process on the host platform, installation may be either hot (CommonPoint running) or cold (CommonPoint NOT running. Both of these processes are described below.

I.I. Hot Installation

Figure 7:
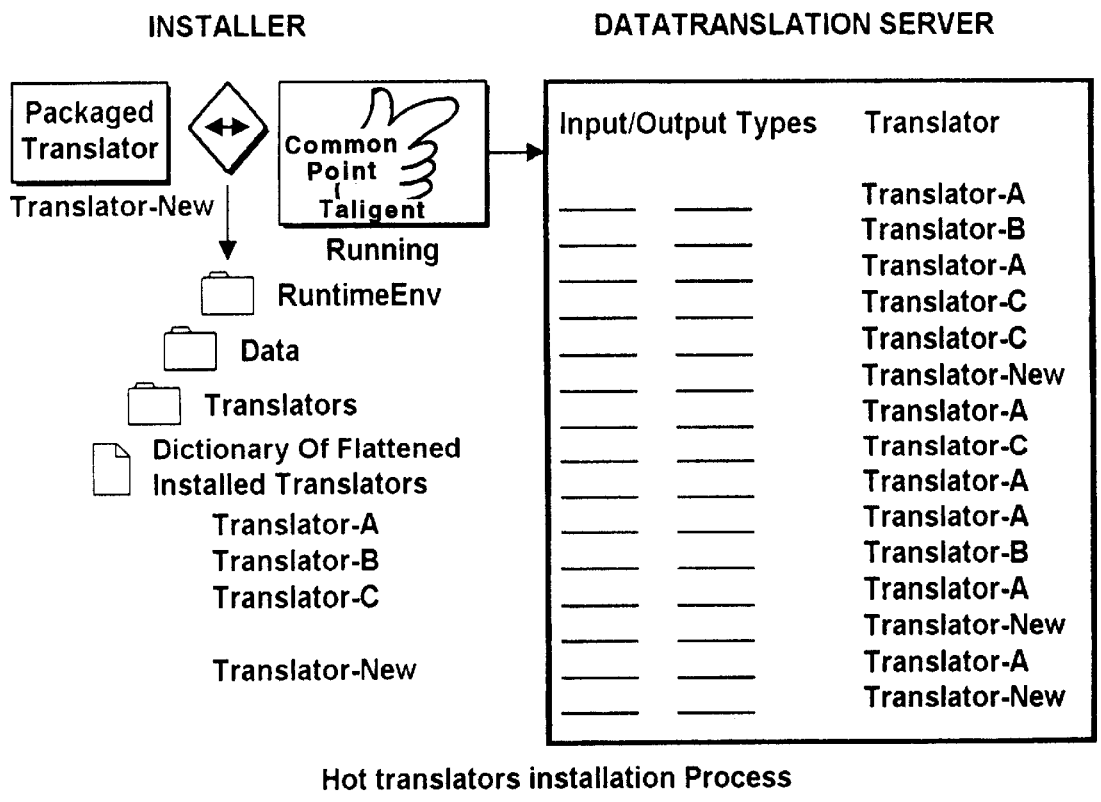
FIG. 7. Shows hot translators installation process

Tentatively hot installation would proceed as depicted in FIG. 7. An installation utility which can both install and remove translations will be provided. The installation utility will work in conjunction with the boiler plate code for archive generation which we will provide and was discussed earlier.

Assuming the design uses a server which serves installed translator surrogates, the following will happen. The installation utility will open a connection to the server and will find out what translator surrogates are installed. It will next start to upload information from the shared libraries and assorted archives. If it finds that one of the translations already exists in the installed base it will ask for human intervention to determine which translation to keep. Don't forget our rule that installed translator surrogate objects are unique. As it loads the translator surrogate into the server it updates the installed translator dictionary as well. The installed translator's dictionary is used at startup time to re-populate the server with information.

As the figure indicates, we are planning to have a server which contains an installed translator surrogate which all of the active compound document can use. We will first implement this without the server and only go to it if we have to increase performance.

II. Cold Installation

Figure 8:
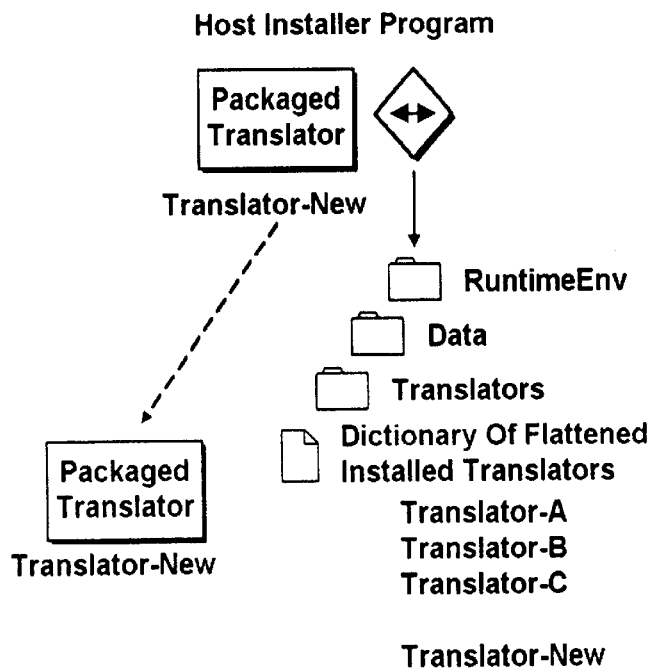
FIG. 8 Shows cold translator installation process

Tentatively cold installation would proceed as depicted in FIG. 8. Installation is performed by the host OS installation utility. The utility will place the Packaged translator in the translator folder under RuntimeEnv as shown in FIG. 10. At startup when the dictionary of the installed translator is resurrected it will also look to see if any new translator packages are present. If they are it will start the CommonPoint provided installation utility and proceed as if it were just a hot installation.

VI. Old to New Mapping

In this section we describe how the old code will be maintained and/or reimplemented in the new design. Currently these are classes which are in the public API.

| OLD API CLASS | CHANGE |
| --- | --- |
| TForeignDataType | Will use TTypeDescription |
| TForeignFileExtension | Will use TStreamTypeDescriptionExtension |
| TForeignData | Will use TStreamScrapitem |
| TForeignFileData | Will use TFileStreamScrapitem |
| TForeignDataTranslator | Will map to TTranslator |

-continued

| OLD API CLASS | CHANGE |
| --- | --- |
| TImportForeignDataQuery | Implementation will use new queries |
| TExportScrapitemsQuery | Implementation will use new queries |
| TExportDocumentQuery | Implementation will use new queries |
| TForeigDataException | Implementation will use TTranslator Exception |

VII. Appendix A. Proposed Classes

This section is a class-by-class overview of the translation framework subsystem. Quite a bit of the normal C++ and CommonPoint special functions (copy constructor, assignment, streaming operators, etc.) are not included in the declaration. These preliminary classes are more of a sanity check on the proposed translation framework design than the actual implementation. Descriptions are provided for only those member functions which are important to the proposed translation framework architecture.

Several of the functions take a TAllocationHeap specification to specify where new objects are created; these follow CommonPoint idiom and not discussed below any further. Internal aspects of all the classes are, of course, omitted.

FIGS. 2–FIG. 5 display the interplay between these classes. The notation used in the figures is the same as that which is used in the CommonPoint information set.

I. Class TStreamTypeDescriptionExtension

The abstract class TStreamTypeDescriptionExtension acts a base class for all of the helper class which are to be used in conjunction with TFileStreamScrapitem to take care of typical file based type description needs. It has one abstract member Matches which takes a TRandomAccessStream and returns true if the data in the stream matches that which is define by the TypeDescriptionExtension.

```
//------------------------------------------------
class TStreamTypeDescription Extension: public TTypeDescriptionExtension
{
public:
    virtual             '~TStreamTypeDesaiptionExtension();
    TStream&            operator>>=(TStream& towhere) const;
    TStream&            operator<c=(TStream& towhere);
protected:
    TStreamTypeDescriptionExtension;
    TStreamTypeDescriptionExtension(const TStreamTypeDescriptionExtension&);
// Returns true if information contained in stream mathches that stored in the Extension
    virtual bool        Matches(const TRandomAccessStream &dataStream) =0;
        TStreamTypeDescriptionExtension&
        operator=(const TStreamTypeDescriptionExtension&);
    virtual bool        operator=(const TStreamTypeDescriptionExtension &other) const;
    virtual bool        operator!=(const TstreamTypeDescriptionExtension &other) const;
    virtual long        Hash() const;
TaligentTypeExtensionDeclarationsMacro_Abstract(TStreamTypeDescriptionExtension)
DynamicCastDeclarationsMacro();
#ifndef NO_Internal
private:
    enum Version {kOriginalversion};
#endif
};
```

II. Class TMagicStreamTypeDescriptionExtension

The concrete class TMagicStreamTypeDescription-Extension is a helper class which is to be used in conjunction with TFileStreamScrapitem to take care of typical file based-type description needs. This class is always treated monomorphically by the system and is never subclassed. This class is used if there is a magic cookie in the file which can be used to help determine its type.

```
//------------------------------------------------
class TMagicStreamTypeDescriptionExtension: public TStreamTypeDescriptionExtension
{
public:
   TMagicStreamTypeDescriptionExtension(const
TMagicStreamTypeDescriptionExtension&);
   TMagicStreamTypeDescriptionExtension (const TStandardText& magic,
       unsigned long length, StreamPosition offset);
     virtual       ~TMagicStreamTypeDescriptionExtension();
     TStream&      operator>>=(TStream& towhere) const;
     TStream&      operator<<=(TStream& towhere);
       void GetMagicNumberinfo(TStandardText& magic, unsigned long& length,
StreamPosition& offset) const;
       bool   Matches(const TRandomAccessStream &datastream);
     TMagicStreamTypeDescriptionExtension&
         operator=(const TMagicStreamTypeDescriptionExtension&);
virtual bool        operator==(const TStreamTypeDescriptionExtension &other) const;
virtual bool        operator!=(const TStreamTypeDescriptionExtension &other) const;
virtual long        Hash() const;
     TaligentTypeExtnesionDeclarationsMacro(TMagicStreamTypeDescriptionExtension)
     DynamicCastDeclarationsMacro();
protected:
     TMagicStreamTypeDesoriptionExtension();
#ifndef NO_internal
private:
   TStandardText fmagic;
   size_t flength;
   StreamPosition foffset;
   enum Version (kOriginalVersion);
#endif
}
```

III. Class TNameFileTypeDescriptionExtension

The concrete class TNameFileTypeDescriptionExtension is a helper class which is to be used in conjunction with TFileStreamScrapitem to take care of typical file based type description needs. This class is always treated monomorphically by the system and is never subclassed. This class is used if there is a the extension in the file name on the host system which helps identity the data stored in the file.
class TNameFileTypeDescriptionExtension: public TFileTypeDescriptionExtension

```
{
public:
   TNameFiteTypeDescriptionExtension(const TNameFiieTypeDescriptionExtension&);
   TNameFileTypeDescription Extension(const TStandardText& fileExtension);
     virtual       ~TNameFiIeTypeDescriptionExtension();
     TStream&      operator>>=(TStream& towhere) const;
     TStream&      operator<<=(TStream& towhere);
     void GetFileExtension(TStandardText& fileExtension);
bool    Matches(const TRandomAccessStream &dataStream);
     TNameFileTypeDescriptionExtension&
       operator=(const TNameFileTypeDescriptionExtension&);
virtual bool        operator==(const TFileTypeDescriptionExtension &other) const;
virtual bool        operator!=(const TFileTypeDescriptionExtension &other) const;
virtual long        Hash() const;
   TaligentTypeExtensionDeclarationsMacro(TNameFileTypeDescriptionExtension)
   DynamicCastDeclarationsMacro();
protected:
```

```
  TNameFileTypeDescriptionExtension();
#ifndef NO_Internal
private:
  TStandardTextfileExtension;
#endif
};
```

IV. Class TMIMEStreamTypeDescriptionExtension

The concrete class TMIMEStreamTypeDescriptionExtension is a helper class which is to be used in conjunction with TFileStreamScrapitem to take care of typical file based type description needs.

TMINEStreamTypeDescriptionExtension represents the type of foreign data the same way a MIME Content-Type header does: as type/subtype pairs like "image/gif" and "text/plain". The type and subtype are case-insensitive. This type is useful for importing and exporting data in MIME-style mail messages and for HTTP data from the World Wide Web. See the Internet RFC 1521 for more details.

class TM MEStreamTypeDescriptionExtension: public TStreamTypeDescriptionExtension {public:

```
      TMMEStreamTypeDescriptionExtension(const char "typeSlashSubtype);
          // Use the given "type|subtype" string
      TMIMEStreamTypeDescriptionExtension(const char "type,
          const char Subtype);
          // Type and subtype are in different strings.
      TMIMEStreamTypeDescriptionExtension(const
TMIMEStreamTypeDescriptionExtension &);
      TMIMEStreamTypeDescriptionExtension(); // For streaming only
      virtual ~IMIMEStreamTypeDescriptionExtension();
// TStreamTypeDescription Extension overrides . . .
virtual bool        operator==(const TStreamTypeDescriptionExtension &other) const;
virtual bool        operator!=(const TStreamTypeDescriptionExtension &other) const;
                    // Compare with another TStreamTypeDescriptionExtension
                    // Checks for class equality first.
virtual long        Hash() const;
bool   Matches(const TRandomAccessStream &dataStream);
// Assorted standard methods and macros
TMIMEStreamTypeDescriptionExtension& operator=(const
TMIMEStreamTypeDescriptionExtension& other);
TStream&           operator>>=(TStream&) const;
TStream&           operator<<=(TStream&);
   TaligentTypeExtensionl)eclarationsMacro(TMIMEStreamTypeDescriptionExtension)
   DynamicCastDeclarationsMacro();
#ifndef NO_Internal
private:
   const char *fTypeString;
   enum {kOriginalVersion};
#endif
};
```

V. Class TTypeDescriptionPair

The concrete class TTypeDescriptionPair is used in the TTranslator class to define the input/output relationship for a given translation. This class is always treated monomorphically by the system and is never subclassed. It has two intresting methods.

```
class TTypeDesriptionPair{
public:
   TTypeDescriptionPair ();
   TTypeDescriptionPair (constTTypeDescriptionPair& copy);
   virtual           ~TTypeDescnptionPair();
   TTypeDescriptionPair (const TTypeDescription& input,
      const TTypeDescription& output);
   void              GetOutputType(TTypeDescription& outputType)const;
   void              GetInputType(TTypeDescription& InputType) const;
   TStream&          operator>>(TStream& towhere) const;
   TStream&          operator<<(TStream& towhere);
   TTypeDescriptionpair &operator=(constTTypeDescriptionPair &);
   virtual bool      operator==(const TTypeDescriptionPair &other) const;
```

-continued

```
virtual bool        operator!=(const TTypeDescriptionPair &other) const;
virtual long        Hash() const;
   TaligentTypeExtensionDeclarationsMacro(TTypeDescriptionPair)
DynamicCastDeclarationsMacro();
#ifndef NO_Internal
private:
   TTypeDescription fInput;
   TTypeDescription fOutput;
#endif);
};
```

GetOutputType
  Returns the output TTypeDescription.
GetInputType
  Returns the input TTypeDescription.
VI. Class TTranslator
  TTranslator is the abstract class from which all translators must inherit. It provides the protocol for performing translations, but subclasses are responsible for providing the implementation. Translators perform translation only on objects which are wrapped in scrap items. This is the primary class which a translator provider must be concerned about. If your translator conforms to this class and you use the boiler plate code which we provide, your translator will be seamlessly integrated into the CommonPoint application environment.

error, because the type negotiation should have failed for the input type.) Subclasses must override this method.
CopyAvailableTypes
  This pure virtual method returns a list described in TTypeDescriptionPair of what translations can be performed by this translator. Subclasses must override this method. This method is used by the CreateTranslatorSurrogates to generate all of the surrogates associated with this particular translator.
CreateTranslatorSurrogates
  This method returns a list of translator surrogates which are supported by this translator. It uses CopyAvailableTypes to generate the list.
MakeArchiveKey
  This static method returns an archive key which when used in conjunction with the boiler plate code which we

```
class TTransiator {
public
   virtual             TTranslator();
   virtual TScrapItem* CreateTranslatedScrapitem(const TTypeDescription &
                       inputDataType, const TScrapitem &inputData,
                       const TTypeDescription &desiredTypeOfScrapItem,
                       TAllocationHeap *heap=0) const = 0;
   virtual void        CopyAvailableTypes(TSequenceOf<TTypeDescriptionPair> &theTypes,
                       TAllocationHeap* = 0) const = 0;
   virtual void        CreateTranslatorSurrogates(const TSequenceOf<TTypeDescriptionPair
&theTypes,
                          TSequenceOf<TTranslatorSurrogate> &theSurrogates,
                          TMlocationHeap* = 0) const;
   static void         MakeArchiveKey (const TTypeDescriptionPair& inoutPair,
                       const TTypeDescription& theTranslatorClass,
                       TText& theArchiveKey);
   TStream&            operator>>=(TStream& towhere) const;
   TStream&            operator<<(TStream& towhere);
// This Method is placed here as and OPEN ISSUE
virtual float    ReturnProgress() const = 0;
   TaligentTypeExtensionDeclarationsMacro_Abstract(TTypeDescriptionPair)
   DynamicCastDeciarationsMacro();
protected:
   TTranslator();
   TTranslator(const TTranslator & copy);
   TTranslator & operator=(const TTranslator & copy);
};
```

CreateTranslatedScrapitem
  This pure virtual method provides the protocol for translating data from an input scrap item to an output scrap item. The data to be translated is in inputData and is described by inputdatatype. The return value is a newly-created TScrapitem containing the output data. If the desiredTypeOfScrapitem is a model type rather than a simple scrap item type, the returned scrap item will be a TModelScrapltem containing the desired model.
  If the input data is the wrong type, TTranslator ::kInvalidTranslator is thrown. (This is usually a programming provide to translator providers will make the translator installable with our installation utility. The key is used to define, for each translation, the input, output, and general text descriptions.
VII. Class TTranslatorSurrogate
  Objects of this concrete monomorphic class are used as stand-ins for TTranslator objects. Installed surrogates are maintained by the framework Surrogates are never instantiated directly, rather they are obtained by using queries. Surrogates always define a unique translation. Surrogates provide additional Text descriptions on the input type, output type, and general descriptions of the translation.

```
class TTranslatorSurrogate {
public:
    TTranslatorsurrogate (const TTypeDescription& in,
            const TTypeDescription& out,
            const TTranslator* theTranslator);
virtual ~TTranslatorSurrogate();
    TTranslatorSurrogate (const TTranslatorSurrogate & copy);
TscrapItem*         CreateTranslatedScrapItem(const TScrapitem & inputData,
                    TAllocationHeap *heap=0) const;
TTypeDescription    GeInputType() const;
TType Description   GetOutputType() const;
void                GetGeneralTextDescrition(TText& text) const;
void                GetInputTextDescrition(TText& text) const;
void                GetOutputTextDescrition(TText& text) const;
void                GetProviderInfo(TText& text) const;
TTypeDescriptionPair &operator=(constTTranslatorSurrogate &);
virtual bool        operator=(const TTranslatorSurrogate &other) const;
virtual bool        operator!=(const TTranslatorSurrogate &other) const;
virtual long        Hash() const;
TStream&            operator>>=(TStream& towhere) const;
    TStream&        operator<<=(TStream8 towhere);
#indef NO__Internal
private:
    TTranslatorSurrogate();
#endif
};
```

CreateTranslatedScrapitem

This method performs data translation from an input scrap item to an output scrap item. The return value is a newly-created scrap Item containing the output data.

GetInputType

Returns the input type description for the translation.

GetOutputType

Returns the output type description for the translation.

GetGeneralTextDescriptlon

Returns a general text description of the translation. The text was supplied by the translator writer.

GetInputTextDescriptlon

Returns a text description of the input type of the translation. The text was supplied by the translator writer.

GetOutputTextDescription

Returns a text description of the output type of the translation. The text was supplied by the translator writer.

VIII. Class TTranslationQuery

This abstract base class provides two static members which clients can use to implement their own queries if the two simple queries that the translations framework provides (TSingleTranslationQuery and TMultipleTranslationQuery) are not sufficient for their needs. The two static member functions are both used to give information on type negotiation and to find out whether a given translation exists.

```
class TTranslationQuery {
public:
    virtual ~TTranslationquery ();
    static void CopyAvailableTypes(const TTypeDescription& inputType,
    TSequenceOf<TTypeDescription>& outputTypes,
        TAllocationHeap* = 0);
    static bool IsThereATranslation(const TTypeDescription& inputType, const TTypeDescription&
    desiredType);
    TaligentTypeExtensionDeclarationsMacro__Abstract(TTypeDescriptionPair)
    DynamicCastDeclarationsMacro();
protected:
    TTranslationQuery ();
    TTranslationQuery (const TTypeDescription& theInput);
    TTranslationQuery (const TTranslationQuery &);
    TTranslationQuery & operator=(const TTranslationQuery &);
    TStream&    operator>>=(TStream& towhere) const;
    TStream&    operator<<=(TStream& towhere);
};
```

Copy Available Types

This member function returns a collection of available translation types which can be performed given the input TTypeDescription when the input Type is specified.

Is There A Translation

This function answers a simple question: Does the given translation exist? If it does it returns true.

IX. Class TSingleTranslationQuery

The translation framework provides a simple query mechanism to locate and use installed translations. These queries can be streamed. It only has one interesting member.

```
class TSingleTransiationQuery: public TTranslationQuery {
public:
   TSingleTranslationQuery ();
   TSingleTranslationQuery (const TTypeDescription& theInput);
TSingleTranslationQuery (const TSingleTranslationQuery& copy);
   TStream&        operator>>=(TStream& towhere) const;
   TStream&        operator<<=(TStream& towhere);
virtual TSingleTranslationQuery ();
virtual bool FindTranslation(TTransiatorSurrogate &theSurrogates,
         TAllocationHeap* = 0);
TSingleTranslationQuery &operator=(const TsingleTranslationQuery &);
virtual bool operator=(const TSingleTranslationQuery &other) const;
virtual bool        operator!=(const TSingleTranslationQuery &other) const;
virtual long        Hash() const;
   TaligentTypeExtensionDeclarationsMacro(TSingleTranslationQuery)
   DynamicCastDeclarationsMacro();
#ifndef NO__Internal
private:
#endif
};
```

Construction

The constructor takes the type description of the input type of the desired translation.

FindTranslation

Returns the translator surrogate if the desired Type of translation is installed and returns false if none is found.

X. Class TMultipleTranslationQuery

The translation framework provides a simple query mechanism to locate and use multiple installed translations. These querie can be streamed. This has one interesting member. class TMultipleTranslationQuery: public TTranslationQuery {public:

```
   TMultipleTranslationQuery ();
   TMultipleTranslationQuery (const TTypeDescription& theInput);
   TMultipleTranslationQuery (const TSequenceOf<TTypeDescription>& theInputs);
   TMultipleTranslationQuery (const TMultipleTranslationQuery& copy);
   TMultipleTranslationQuery & operator=(const TMultipieTranslationQuery &);
   TStream&        operator>>=(Tstream& towhere) const;
   TStream&        operator<<=(TStream& towhere);
virtual ~TMultipleTranslationQuery ();
virtual bool FindTranslations(TSequenceOf<TTranslatorSurrogate>&theSurrogates,
         TAllocationHeap* = 0);
virtual bool        operator==(const TMultipleTranslationQuery &other) const;
virtual bool        operator!=(const TMultipleTranslationQuery &other) const;
virtual long        Hash() const;
   TaligentTypeExtensionDeclarationsMacro(TMultipleTranslationQuery)
DynamicCastDeclarationsMacro();
#ifndef NO__Internal
private:
#endif
}
```

FindTranslations

This member function returns a seqeunce of types and a sequence of TTranslatorSurrogates that correspond to those types for the given InputTypeDescription. If none are found it returns false.

XI. Class TFileTranslationQuery

The FileTranslationQuery is unique in that it does not return a surrogate. This query is mainly intended to be used with data files on the host system. The query is constructed with a TFile. The query returns a sequence of TFileTypeDescriptionExtensions. This sequence of TFileTypeDescriptionExtensions is a guess of what data is likely to be in the file. One of the TFileTypeDescriptionExtensions that is returned can then be used to construct a TFileStrearnScrapitem.

```
class TFileTranslationQuery: public TTranslationQuery {
public:
    TFileTransiationQuery (TFile& existingFile);
    TFileTranslationQuery (TFile& existingFile, const TTypeDescription& aGuess);
    TFileTranslationQuery (TFile& existingFile,const TSequenceOf<TTypeDescription>&
    listOfGuesses);
    TFileTranslationQuery (const TFileTranslationQuery& copy);
    TFileTranslationQuery & operator=(const TFileTranslationQuery &);
    TStream&        operator>>=(TStream& towhere) const;
    TStream&        operator<<=(TStream& towhere);
    virtual ~TFileTranslationQuery ();
    virtual bool FoundPossibleType(TSequenceOf<TFileTypeDescriptionExtension>
&possibleMatches,
            TAllocationHeap* = 0);
    virtual bool        operator==(const TFileTranslationQuery &other) const;
    virtual bool        operator!=(const TFileTranslationQuery &other) const;
    virtual long        Hash() const;
    TaligentTypeExtensionDeclarationsMacro(TFileTranslationQuery & other) const:
    DynamicCastDeclarationsMacro();
#ifndef NO__Internal
private:
#endif
```

XII. Class TStreamScrapitem

This abstract class is used to represent a data source or sink which can be used to read or write a translation's input or output. Note that this class uses the dynamic cast macros so that translators can downcast subclasses.

```
class TStreamScrapItem: public TScrapitem
{
public:
virtual ~TStreamScrapitem ();
virtual TTypeDescription        GetScrapitemType()const = 0;
virtual TRandomAccessStream *   CreateStreamForReading(TAllocationHeap * = 0) const
                                = 0;
virtual TRandomAccessStream *   CreateStreamForWriting(unsigned long initialSize=0,
                                    TAllocationHeap* = 0) = 0;
virtual TStream&                operator>>=(TStream& toWhere) const;
virtual TStream&                operator<<=(TStream& fromWhere);
virtual bool                    operator==(const TFileTranslationQuery &other) const;
virtual bool                    operator!=(const TFileTranslationQuery &other) const;
virtual long                    Hash() const;
    TaligentTypeExtension DeclarationsMacro__Abstract(TStreamScrapitem)
DynamicCastDeclarationsMacro();
protected:
    virtual void                InternalCopyAvailableTypes(TSequenceOf<TTypeDescription>& result,
TMemoryHeap &whichHeap) const
TStreamScrapitem ();
TStreamScrapitem (const TStreamScrapitem & copy);
TStreamScrapitem & operator=(const TStreamScrapitem & assign);
};
```

GetScrapitemType

Returns the type of the data contained in the scrap item.

CreateStreamForReading

Creates a randam-access stream which can be used to read the data represented by this object. The caller is responsible for deleting the returned stream.

CreateStreamForWriting

Creates a random-access stream which can be used to write into the data location represented by this object. The caller is responsible for deleting the returned stream.

The initialSize parameter specifies the initial size of the data (file, memory, whatever) that is created. This is an optimization only; the returned stream must be able to grow, and an initial size of zero is the default.

Note that this method is non-const while CreateStreamForReading is const. This means that a const TForeignData object can be used to represent a read-only foreign data source. The import/export translation methods of TForeignDataTranslator take advantage of this to provide a bit more safety.

XIII. Class TFileStreamScrapitem

This concrete subclass of the stream is used to represent data stored in a file accessible to the Taligent file system. Note that this class uses the dynamic cast macros so that translators can downcast to specific subclasses.

```
class TFileStreamScrapitern: public TStreamScrapitem
{
public:
   virtual ~TFileStreamScrapitern ();
   TFileStreamScrapitem (TFile& existingFile,
      TFileTypeDescriptionExtension&);
   TFileStreamScrapitem (TDirectory parent,
      const TFileSystemEntityName &newFileName
      ,TFileTypeDescriptionExtension&);
   TFileStreamScrapitem ();
virtual TFileTypeDescriptionExtension*    GetTypeDescriptionExtension()const;
virtual TTypeDescription         GetScrapitemType()const;
virtual TRandomAccessStream*        CreateStreamForReading(TAllocationHeap* = 0) const;
virtual TRandomAccessStream*        CreateStreamForWriting(unsigned long initialSize=0,
            TAllocationHeap* = 0);
virtual TStream&    operator>>=(Tstream& toWhere) const;
virtual TStream&    operator<<=(TStream& fromWhere);
protected:
virtual void InternalCopyAvailableTypes(TSequenceOf<TTypeDescription>& result,
Th4emoryHeap &whichHeap) const;
virtual bool       operator==(const TFileTranslationQuery & other) const;
virtual bool       operator!=(const TFileTranslationQuery &other) const;
virtual long       Hash() const;
   TaligentTypeExtensionDeclarationsMacro(TFileStreamScrapltem)
DynamicCastDeclarationsMacro();
#ifndef NO__Internal
private:
   TFileStreamScrapltem & operator=(const TFileStreamScrapitem & assign);
   TFileStreamScrapitem (const TFileStreamScrapitem & copy);
#endif
}
```

GetScrapitemType
   Returns the type of the data contained in the scrap item.
CreateStreamForReading
   Creates a random-access stream which can be used to read the data represented by this object. The caller is responsible for deleting the returned stream.
CreateStreamForWriting
   Creates a randam-access stream which can be used to write into the data location represented by this object. The caller is responsible for deleting the returned stream. The initialSize parameter specifies the initial size of the data (file, memory, whatever) that is created. This is an optimization only; the returned stream must be able to grow, and an initial size of zero is the default.

MatchesMagicNumber
   Returns true if the magic number in the stream matches that which is stored in the TFileStreamTypeDescriptionExtension.
MatchesFileExtension
   Returns true if the file extension in the file name matches that which is stored in the TFileStreamTypeDescriptionExtension.
XIV. Class TlnstalledTranslatorSurrogates
   This class is a private class which holds most of the implimentation for the rest of the framework. It is also used to add and remove translations to the installed base of translators. It has a number interesting member functions which are very similar to most of the member funtons presented above.

```
// TInstalledTranslatorSurrogates is an internal class
class TInstalledTranslatorSurrogates {
pubiic
      TInstalledTranslatorSurrogates();
   virtual ~TinstalledTranslatorSurrogates ();
static const TInstalledTranslatorSurrogates*    GetDefaultinstalledTranslatorSurrogates();
   TTranslatorSurrogate CreateTranslator(const TTypeDescription & inputType,
         const TTypeDescription & outputType,
      TAllocationHeap* = 0);
virtual bool FindTranslation (const TTypeDescription & inputType,
         const TTypeDescription& types,
         const TTranslatorSurrogate &theSurrogates,
         TAllocationHeap* = 0);
virtual bool FindTranslations(const TTypeDescription & inputType,
         TSequenceOf<TTypeDescription>& types,
         TSequenceof<TTranslatorSurrogate>&theSurrogates,
         TAllocationHeap* = 0);
void CopyAvailableTypes(const TTypeDescription& inputType,
         Tcollectionof<TTypeDescription>& outputTypes,
         TMlocationHeap* = 0);
bool IsThereATranslation(const TTypeDescription& inputType,
         const TTypeDescription& desiredType);
void AdoptTranslatorSurrogate( TTranslatorSurrogate *adoptMe);
```

-continued

```
bool DeleteTranslation(const TTypeDescription & inputType,
        const TTypeDescription & outputType);
private:
        TInstalledTranslatorSurrogates & operator=(const TInstalledTranslatorSurrogates &);
        virtual TStream&   operator>>=(TStream&) const;
        virtual TStream&   operator<<=(TStream&);
        TInstalledTranslatorSurrogates(const TInstalledTranslatorSurrogates ©);
};
```

GetDefaultInstalledTranslatorSurrogates

Returns a pointer the object that is hold all of the current information for all of the installed translations.

CreateTranslator

FindTranslation

FindTranslations

Copy AvailableTypes

IsThereATranslation

AdoptTranslatorSurrogate

Adopts a new surrogate.

DeleteTranslation

For the given input and output type description, it deletes the translation. Although a specific embodiment of the invention has been disclosed, it will be understood by those having skill in the art that changes can be made to that specific embodiment without departing from the spirit and the scope of the invention.

What is claimed is:

1. A method for translating a source document object having a first format into a target document object having a second format in a computer system having a non-volatile storage and a volatile storage, the method comprising the steps of:

(a) storing a plurality of translator classes in the non-volatile storage, each of the plurality of translator classes having a plurality of translation rules for converting source document objects having first formats into target document objects having second formats;

(b) creating a plurality of surrogate translator objects in the volatile storage, each of the plurality of surrogate translator objects being accessible by a translation query object in response to a client request for translation of a source document object having a first format into a target document object having a second format;

(c) accessing a surrogate translator object by a translation query object in response to a client request for translation of a source document object having a first format into a target document object having a second format;

(d) said surrogate translator object causing a streaming of one of said plurality of translator classes into said volatile storage and an instantiation of a translator object therefrom in response to said accessing of said surrogate translator object; and (e) performing with said translator object a translation of said source document object into said target document object.

2. An article of manufacture for use in a computer system, comprising:

a computer useable medium having computer readable program code means embodied therein for translating a source document object having a first format into a target document object having a second format in a computer system having a non-volatile storage and a volatile storage, the computer readable program code means in said article of manufacture comprising:

(a) computer readable program code means for causing a computer to store a plurality of translator classes in the non-volatile storage, each of the plurality of translator classes having a lurality of translation rules for converting source document objects having first formats into target document objects having second formats;

(b) computer readable program code means for causing a computer to create a plurality of surrogate translator objects in the volatile storage, each of the plurality of surrogate translator objects being accessible by a translation query object in response to a client request for translation of a source document object having a first format into a target document object having a second format;

(c) computer readable program code means for causing a computer to access a surrogate translator object by a translation query object in response to a client request for translation of a source document object having a first format into a target document object having a second format;

(d) said surrogate translator object causing a streaming of one of said plurality of translator classes into said volatile storage and an instantiation of a translator object therefrom in response to said accessing of said surrogate translator object; and (e) computer readable program code means for causing a computer to perform with said translator object a translation of said source document object into said target document object.

3. A system for translating a source document object having a first format into a target document object having a second format in a computer system having a non-volatile storage and a volatile storage, the system comprising:

(a) means for storing a plurality of translator classes in the non-volatile storage, each of the plurality of translator classes having a plurality of translation rules for converting source document objects having first formats into target document objects having second formats;

(b) means for creating a plurality of surrogate translator objects in the volatile storage, each of the plurality of surrogate translator objects being accessible by a translation query object in response to a client request for translation of a source document object having a first format into a target document object having a second format;

(c) means for accessing a surrogate translator object by a translation query object in response to a client request for translation of a source document object having a first format into a target document object having a second format;

(d) said surrogate translator object causing a streaming of one of said plurality of translator classes into said volatile storage and an instantiation of a translator object therefrom in response to said accessing of said surrogate translator object; and (e) means for performing with said translator object a translation of said source document object into said target document object.

* * * * *

UNITED STATES PATENT AND TRADEMARK OFFICE
CERTIFICATE OF CORRECTION

PATENT NO. : 6,253,205 B1
DATED : June 26, 2001
INVENTOR(S) : James A. Quarato et al.

It is certified that error appears in the above-identified patent and that said Letters Patent is hereby corrected as shown below:

<u>Column 28,</u>
Line 13, "lurality" should be -- plurality --.

Signed and Sealed this

Seventh Day of May, 2002

Attest:

Attesting Officer

JAMES E. ROGAN
*Director of the United States Patent and Trademark Office*